(12) United States Patent
Baranowski et al.

(10) Patent No.: US 10,940,897 B2
(45) Date of Patent: Mar. 9, 2021

(54) TAILGATE FOR A MOTOR VEHICLE, AND METHOD FOR PRODUCING SUCH A TAILGATE

(71) Applicant: Ford Global Technologies, LLC, Dearborn, MI (US)

(72) Inventors: Thomas Baranowski, Wuerselen (DE); Maik Broda, Wuerselen (DE); Markus Franzen, Stolberg (DE); Pascal Rebmann, Weilerswist (DE)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 16/366,090

(22) Filed: Mar. 27, 2019

(65) Prior Publication Data
US 2019/0300074 A1  Oct. 3, 2019

(30) Foreign Application Priority Data

Mar. 28, 2018 (DE) ...................... 10 2018 204 733.2

(51) Int. Cl.
| | | |
|---|---|---|
| *B62D 33/027* | (2006.01) | |
| *B62D 29/00* | (2006.01) | |
| *B62D 33/04* | (2006.01) | |
| *B32B 27/08* | (2006.01) | |
| *B32B 27/10* | (2006.01) | |
| *B60J 5/10* | (2006.01) | |

(52) U.S. Cl.
CPC ............ *B62D 29/005* (2013.01); *B32B 27/08* (2013.01); *B32B 27/10* (2013.01); *B60J 5/107* (2013.01); *B62D 29/008* (2013.01); *B62D 33/04* (2013.01)

(58) Field of Classification Search
CPC ....... G10K 11/168; B32B 23/00; B32B 23/06; B32B 23/08; B32B 23/048; B32B 23/10; B32B 27/10; B32B 27/08; B32B 27/12; B32B 27/065
USPC .......................................... 296/191, 210, 211
See application file for complete search history.

(56) References Cited

U.S. PATENT DOCUMENTS

| | | | | |
|---|---|---|---|---|
| 8,550,536 B2* | 10/2013 | Gachter | ................... | B60J 5/101 296/146.8 |
| 8,985,675 B1* | 3/2015 | Gangal | .................... | B60J 5/101 296/146.8 |
| 9,272,606 B2 | 3/2016 | Schijve et al. | | |
| 2006/0254744 A1* | 11/2006 | Gordon | ................. | B22D 19/02 164/98 |

(Continued)

FOREIGN PATENT DOCUMENTS

| | | |
|---|---|---|
| DE | 60031332 | 8/2007 |
| JP | 2015030382 | 2/2015 |
| JP | 2015093582 | 5/2015 |

*Primary Examiner* — Dennis H Pedder
(74) *Attorney, Agent, or Firm* — Burris Law, PLLC

(57) ABSTRACT

A tailgate for a motor vehicle includes a metallic main body and at least one fiber-reinforced tape disposed on and/or in the metallic main body. The at least one fiber-reinforced tape has reinforcement fibers embedded in a matrix material composed at least in part of a metallic material. The tailgate can include at least one additional component that is at least in part embedded in the main body. The at least one additional component can have at least one connection portion and a loop of the fiber-reinforced tape can be guided around the at least one connection portion.

20 Claims, 3 Drawing Sheets

(56) References Cited

U.S. PATENT DOCUMENTS

2008/0203743 A1     8/2008   Dekeyser et al.
2017/0361781 A1*   12/2017   Khayat .................. B60J 5/107

* cited by examiner

TAILGATE FOR A MOTOR VEHICLE, AND METHOD FOR PRODUCING SUCH A TAILGATE

CROSS-REFERENCE TO RELATED APPLICATIONS

This application claims priority to and the benefit of German Application No. 102018204733.2 filed on Mar. 28, 2018. The disclosure of the above application is incorporated herein by reference.

FIELD

The present disclosure relates to a tailgate of a motor vehicle and a method for producing a tailgate for a motor vehicle.

BACKGROUND

The statements in this section merely provide background information related to the present disclosure and may not constitute prior art.

Conventional tailgates of motor vehicles are assemblies of complex construction of various components and materials, so as to mutually combine a diversity of construction features and functions. Said construction features or functions, respectively, include lights, brake lights, joints, a rear window, and the like, and moreover accident-relevant and safety-relevant mechanical properties. In particular, a tailgate must remain in the closed position thereof during an accident and after the accident, so as to meet statutory safety directives. Above all, the region around a tailgate lock that is disposed on the tailgate is desired since any breakage of the material in this region can lead to the tailgate lock being released from the tailgate such that the tailgate can move from the closed position thereof during or after an accident.

U.S. Pat. No. 8,550,536 discloses a tailgate for a motor vehicle, having a partial support structure from a fiber-reinforced thermoplastic plastics material and an integral main support structure having an encircling flexurally rigid frame which has an upper crossbeam, two lateral longitudinal beams, and at least one lower crossbeam. The main support structure is composed of a fiber-reinforced molding compound which has at least two impregnated integrated continuous-fiber tapes and which is connected to a rear window of the tailgate in a force-fitting manner such that said main support structure conjointly with the rear window forms a flexurally rigid structure. The continuous-fiber tapes in portions are integrated in the frame and have an arrangement that is vertical to the surface of the tailgate in that the continuous-fiber tapes are disposed so as to be vertical to the surface and/or so as to be vertically spaced apart from the surface. By way of the spatial shaping of the fiber-reinforced molding compound, the continuous-fiber tapes are connected to one another as force-transmitting and reinforcing connection regions. The frame has crease-shaped reinforcements of the molding compound.

Japan Patent Application No. 2015093582A2 discloses a vehicle door having an internal panel that is disposed on an internal side of the vehicle, an external panel that is disposed on an external side of the vehicle, and a motor vehicle license plate that is attached to a face on the external side of the vehicle of the external panel. The internal panel has a door glass opening which is provided in an upper portion and to which a door glass is attached, and a panel portion which is provided below the door glass opening, and a plurality of beads which bulge toward an internal side of the vehicle or to an external side of the vehicle. The motor vehicle license plate that is attached to the external panel is disposed such that said motor vehicle license plate, when viewed from the rear of the vehicle, overlaps a portion of the panel portion of the internal panel. The plurality of beads have a pair of upper oblique beads which in terms of the profile thereof run from positions on the panel portion which, when viewed from the rear of the vehicle, correspond to upper corners of the motor vehicle license plate, in an oblique upward manner toward an external side in the vehicle cross direction, and a pair of lower oblique beads which in terms of the profile thereof run from positions on the panel portion which, when viewed from the rear of the vehicle, correspond to lower corners of the motor vehicle license plate, in an oblique downward manner toward an external side in the vehicle cross direction.

Japan Patent Application No. 2015030382A discloses a rear-side door of plastics material, said rear-side door being provided on a rear-side opening of the vehicle body in such a manner that said rear-side door is capable of being opened and closed. The rear-side door has an external plate and an internal plate, each being produced from a shaped plastics material item which has an upper part which is provided with a window opening, wherein the external plate and the internal plate in circumferential parts of said plates and in circumferential portions of the window opening are integrally connected to one another, wherein an upper end part which defines an upper side of the window opening by means of a hinge is pivotably connected to an upper side of the rear-side opening of the vehicle body. The rear-side door furthermore has a locking mechanism which is attached to a lower end part of the internal plate so as to be capable of engaging with a closing bracket fastened to a lower side of the rear-side opening of the vehicle body and so as to be releasable from said closing bracket. An internal space is formed between the external plate and the internal plate. The rear-side door moreover has at least one element from the group of wire cable or wiring harness for connecting the upper end part to a main body part that is disposed below the window opening. Right and left sides of the window opening are in each case defined by pillar parts. A pair of ribs that extend in a longitudinal direction of at least one of the pillar parts is provided so as to project on an internal face of the at least one pillar part, wherein the internal faces point toward the interior space of the internal plate. A passage for disposing the at least one element from the group of wire cable or wiring harness is defined between the pair of ribs. A reinforcing long fiber is insert-molded along the passage in a cross section of the internal plate.

U.S. Pat. No. 9,272,606 discloses a side door for a vehicle. The side door has a structure having a plastics material shell which has a shell support beam which is positioned above a main body portion of the shell, wherein the shell support beam has substantially unidirectional fiber-tape portions. The plastics material shell has an internal plastics material shell and an external plastics material shell.

U.S. Patent Publication No. 2008/0203743 discloses a method for producing an impact-absorbing device. A matrix volume and a tape-type device having elongate metal elements are provided. Press-molding of the matrix volume and fastening of the tape-type device to the press-molded matrix volume is performed. This two-staged approach enables a higher degree of freedom in the construction of the impact-absorbing device, and complex structures can be preserved.

SUMMARY

The present disclosure provides a tailgate having improved load-transmitting and load-distributing properties.

The tailgate of the present disclosure is improved by having the features of claim 1, in which tailgate the matrix material is at least in part composed of a metallic material.

It is to be pointed out that the features and measures set forth individually in the following description may be combined with one another in any desired technically meaningful way and disclose further configurations of the present disclosure. The description, in particular in conjunction with the figures, characterizes and specifies the present disclosure further.

According to the present disclosure the main body is reinforced by means of at least one fiber-reinforced tape which has a metallic matrix material. Tailgates which are of lighter weight and which in regions of high mechanical stress, in particular in regions which are heavily stressed in the event of a rear-side accident, are provided with one or a plurality of fiber-reinforced tapes can be produced on account thereof. Any unacceptable breakage of the tailgate can be largely inhibited by way of the disposal of the fiber-reinforced tape on the main body according to the present disclosure. The present disclosure moreover offers the potential for safety features to be integrated in the tailgate of a motor vehicle in combination with adaptable reinforcement structures, in order for a lightweight tailgate to be produced.

The main body from the metallic material, for example aluminum, can be produced while using a die casting method, for example. Accordingly, the main body is thus a die cast component. The metallic material of the main body can be a light metal or steel.

The fiber-reinforced tape can be configured as a flat tape having reinforcement fibers that are aligned so as to be unidirectional in the longitudinal direction of the tape, or so as to be bidirectional or multidirectional. The fiber-reinforced tape can be constructed from two or more layers having dissimilar fiber alignments. The metallic matrix material of the fiber-reinforced tape, in particular in terms of the melting temperature thereof, can be similar or identical to the metallic material of the main body such that the metallic matrix material can connect to the metallic material of the main body in a materially integral manner (e.g., metallurgically bonded) during die casting. Any release of the fiber-reinforced tape from the main body is reliably inhibited on account thereof. The reinforcement fibers of the fiber-reinforced tape can be, for example, ceramic fibers, carbon fibers, or other man-made or natural fibers (for example basalt). The fiber-reinforced tape can be partially or completely disposed in the main body. Alternatively, the fiber-reinforced tape can be partially or completely disposed externally on the main body. The tailgate according to the present disclosure can also have two or more corresponding fiber-reinforced tapes.

The fiber-reinforced tape, by virtue of the metallic matrix material thereof, can be integrated in the production of the tailgate according to the present disclosure in a simple manner. The metallic matrix material of the fiber-reinforced tape can be adapted to the metallic material of the main body such that it is possible for various types of fiber-reinforced tapes to be integrated in the tailgate and for the tailgate to be reinforced on account thereof. On account of the fiber-reinforced tape being integrated in the production process of the tailgate, mechanical requirements can be met by virtue of the tailored local reinforcements in highly stressed regions of the tailgate. Moreover, costs can be saved and the assembly complexity can be reduced. The combination of the at least one fiber-reinforced tape and the metallic main body for configuring the tailgate enables the production of lighter-weight reinforced tailgates while using suitable production methods such as, for example, a die casting method.

The motor vehicle can be a passenger motor vehicle or a commercial vehicle, for example.

According to one advantageous form of the present disclosure the metallic material is aluminum or magnesium. These lightweight materials can connect to the main body in a materially integral manner during die casting of the main body of the tailgate, for example, in particular when the main body is likewise produced from aluminum or magnesium.

One further advantageous form of the present disclosure provides that the fiber-reinforced tape is connected indirectly to the main body by way of an adhesive, or directly to the main body in a materially integral manner. In the case of the first alternative, the fiber-reinforced tape can be attached to the main body after the production of the main body of the tailgate has been performed. In the case of the second alternative, the main body and the fiber-reinforced tape can be connected to one another in a materially integral manner during the production of the main body, for example while using a die casting method. Subsequently attaching the fiber-reinforced tape to the main body by means of a welding procedure is also possible.

According to one further advantageous form of the present disclosure the tailgate has at least one additional component which is at least in part embedded in the main body and which has at least one connection portion around which a loop of the fiber-reinforced tape is guided. Accordingly, the fiber-reinforced tape, while forming the loop, is wrapped around the connection portion of the additional component and, in the event of the tailgate being impinged with tensile forces, or the main body of the tailgate being destroyed, respectively, because of an accident is thus coupled directly to the additional component in a force-transmitting manner. A form-fit between the additional component and the main body is provided since the additional component is partially or completely embedded in the main body. On account thereof, the fiber-reinforced tape is anchored to the main body by means of the additional component. The additional component preferably serves for fastening at least one further vehicle component to the tailgate and is disposed on such a portion of the tailgate which in the event of an accident is very heavily mechanically stressed and can break herein. The additional component herein can assume the function of a reinforcement component. It can moreover be guaranteed by way of the present disclosure that the fiber-reinforced tape remains securely connected to the further vehicle component that is fastened to the additional component even in the event of the main body breaking in the region of the additional component.

The additional component can be a fastening element, for example, to which a tailgate lock can be fastened. The stresses that arise on a tailgate in the region of the tailgate lock in the event of a rear-side accident are usually relatively high. Conventionally, this can lead to a breakage of the tailgate and to the tailgate lock being released from the tailgate such that the tailgate can move out of the closed position thereof during or after the accident, the latter having to be inhibited. On account of one form of the tailgate according to the teachings of the present disclosure, the fiber-reinforced tape by way of the additional component is securely connected to the tailgate lock such that it can be reliably inhibited that the tailgate lock is completely released from the tailgate during an accident. In the event of a respective accident situation, the fiber-reinforced tape, on account of the better mechanical properties thereof along the reinforcement fibers, serves as a link between the main body and the additional component, or the tailgate lock fastened to the latter, even when the fiber-reinforced tape has been partially released from the main body.

The connection portion of the additional component can have at least one breakout, for example, which can be configured so as to be rectangular, for example, so as to be able to guide the fiber-reinforced tape through the breakout and around the connection portion without bulging said fiber-reinforced tape about the longitudinal central axis of the latter. The additional component can also have two or a plurality of corresponding connection portions, a loop of a single fiber-reinforced tape being in each case guided around said connection portions, or a loop of separate fiber-reinforced tapes being in each case guided around said connection portions. The additional component can be partially or completely produced from a metal or a metal alloy. The tailgate can also have two or a plurality of corresponding additional parts which are in each case connected to one or a plurality of fiber-reinforced tapes.

The above improvement of the tailgate is furthermore achieved by a method comprising the following steps:
  providing at least one fiber-reinforced tape which has a matrix material which is at least in part composed of a metallic material and which has reinforcement fibers embedded therein;
  attaching the fiber-reinforced tape within an opened die casting mold;
  closing the die casting mold; and
  configuring a main body by pressing a metallic material into the closed die casting mold such that the fiber-reinforced tape is at least in part embedded in the main body.

The method is correspondingly associated with the advantages mentioned above with regard to the tailgate. In particular, the tailgate according to one of the abovementioned forms or any combination of at least two of the forms with one another can be produced by means of the method. According to the method, the fiber-reinforced tape is connected to the main body in a materially integral manner during the production of said main body.

The die casting method used for producing the main body can additionally be used for integrating further functional components in the tailgate. A functional component can be, for example, a loudspeaker fastening, a joint, a door lock, an interior trim, an impact protection installation, a cable duct, a clip, a handle, a window, a window-guiding system, a rear spoiler, a wiper installation, a rear light, or the like.

The production according to the present disclosure of the tailgate offers a higher degree of freedom in terms of design, on account of which the tailgate can be adapted individually to the respective requirements. Production costs can moreover be reduced, in particular since the tailgate is produced while using fewer individual components and the majority of the tailgate, specifically the main body, is configured so as to be monolithic. Tailgates of lighter weights can in particular be produced by the method according to the present disclosure. Additional cost savings can be implemented on account of the functional integration of the components of the tailgate and on account of the reduction in terms of the complexity and time associated with the production of the tailgate. The present disclosure can moreover be combined with other technologies such as, for example, multi-component die casting tools, multi-component die casting materials and the same. The present disclosure can be used for production procedures such as, for example, punching, forging, extruding, and casting.

According to one advantageous form of the present disclosure, prior to closing the die casting mold at least one additional component which has at least one connection portion is disposed within the opened die casting mold, in the case of an opened die casting mold a loop of the fiber-reinforced tape is guided around the connection portion of the additional component, and the additional component is at least in part embedded in the main body. The form is correspondingly associated with the advantages mentioned above with regard to the corresponding form of the tailgate. A desired positioning of the fiber-reinforced tape within the die casting mold can be provided on account of the attachment and the fixed positioning of the additional component within the opened die casting mold, and on account of the disposal of the fiber-reinforced tape on the additional component.

The above improvement of the tailgate is furthermore achieved by a method comprising the following steps:
  providing at least one fiber-reinforced tape which has a matrix material which is at least in part composed of a metallic material and which has reinforcement fibers embedded therein;
  providing at least one metallic main body; and
  connecting the fiber-reinforced tape to the main body in a materially integral manner.

The method is correspondingly associated with the advantages mentioned above with regard to the tailgate. In particular, the tailgate according to one of the abovementioned forms or any combination of at least two of the forms with one another can be produced by means of the method. According to this method, the fiber-reinforced tape is subsequently connected to the main body in a materially integral manner.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

In the different figures, identical parts are always provided with the same reference signs, and thus said parts are typically also described only once.

Figure 1:
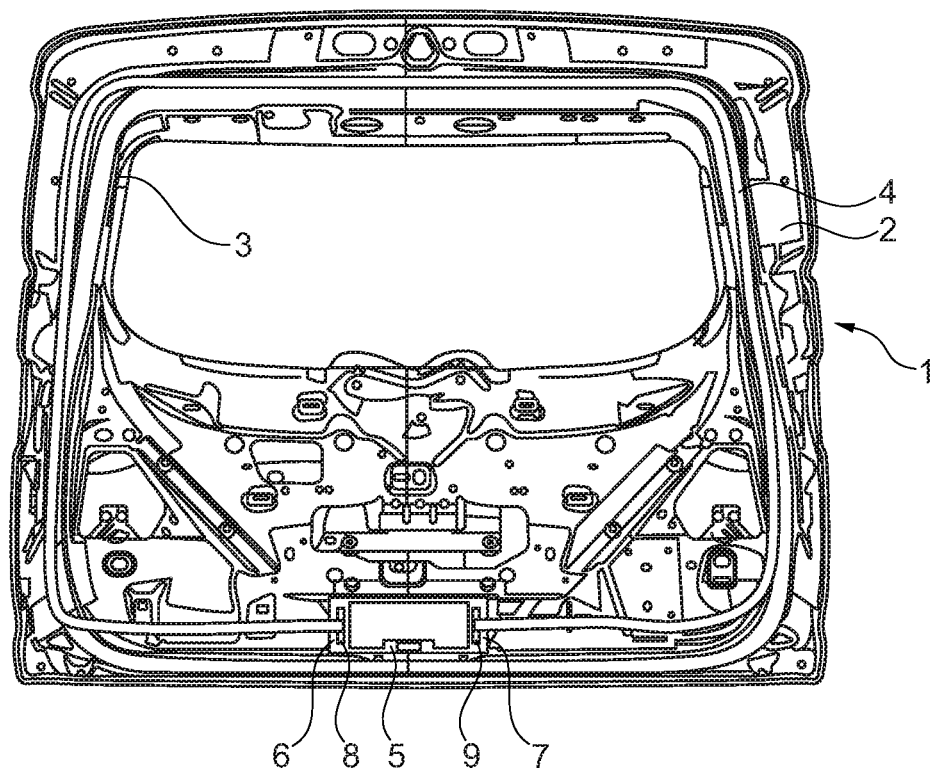
FIG. 1 shows a schematic illustration of an exemplary form of a tailgate according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic illustration of an exemplary form of a tailgate 1 for a motor vehicle (not shown) according to the teachings of the present disclosure.

The tailgate 1 has a metallic main body 2 formed from a die-cast metallic material. A window opening 3 for receiving a rear window (not shown) is configured on the main body 2.

The tailgate 1 moreover has a fiber-reinforced tape 4 that is disposed on and/or in the main body 2. The fiber-reinforced tape 4 is disposed so as to encircle the window opening 3 and to be in an encircling peripheral region of the main body 2. The fiber-reinforced tape 4 has reinforcement fibers embedded in a matrix material, wherein the matrix material is partially or completely composed of a metallic material such as, for example, aluminum or magnesium. The fiber-reinforced tape 4 is connected indirectly to the main body 2 by way of an adhesive, or directly to the main body 2 in a materially integral manner.

The tailgate 1 furthermore has an additional component 5 which is at least in part embedded in the main body 2 and which serves for fastening a tailgate lock (not shown) to the tailgate 1, and which has two laterally disposed connection portions 6 and 7 around which in each case a loop of the fiber-reinforced tape 4 is guided. To this end, two rectangular breakouts 8 and 9 through which the fiber-reinforced tape 4 is guided are configured on the additional component 5. The additional component 5 is thus a fastening element to which the tailgate lock can be fastened. The additional component 5 is partially or completely produced from a metal or a metal alloy.

Figure 2:
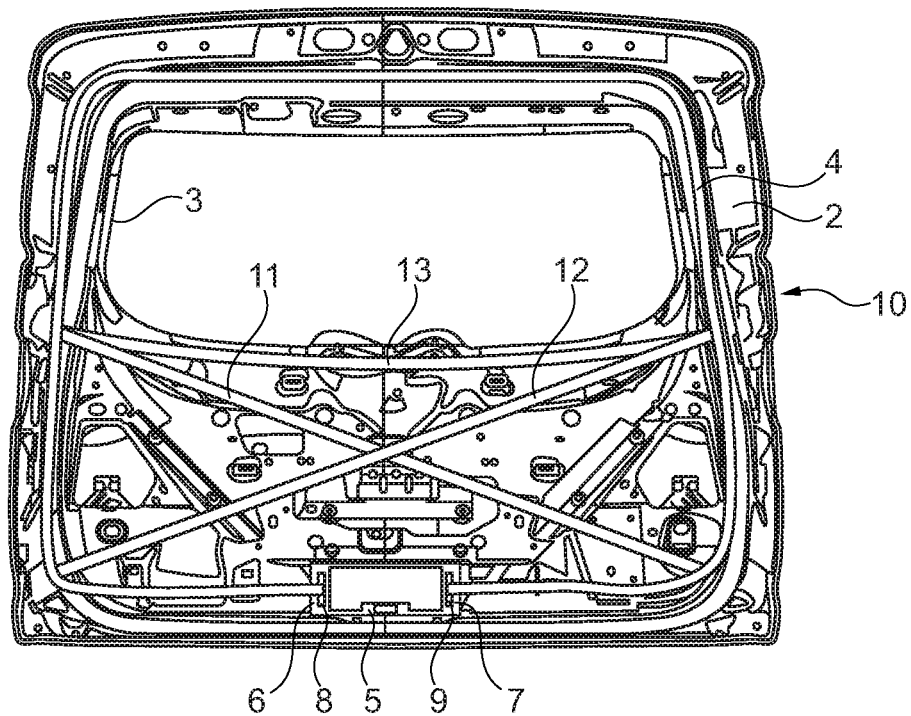
FIG. 2 shows a schematic illustration of a further exemplary form of a tailgate according to the teachings of the present disclosure.

FIG. 2 shows a schematic illustration of a further exemplary form of a tailgate 10 according to the teachings of the present disclosure. The tailgate 10 differs from the exemplary form shown in FIG. 1 in that three additional fiber-reinforced tapes 11, 12, 13 are present, wherein the two tapes 11 and 12 run in an inclined manner, intersect one another, and at the end side are connected to the tape 4, and the tape 13 runs in a horizontal manner and at the end side is connected to the tape 4. To avoid repetitions, reference is made in other respects to the above description of FIG. 1.

Figure 3:
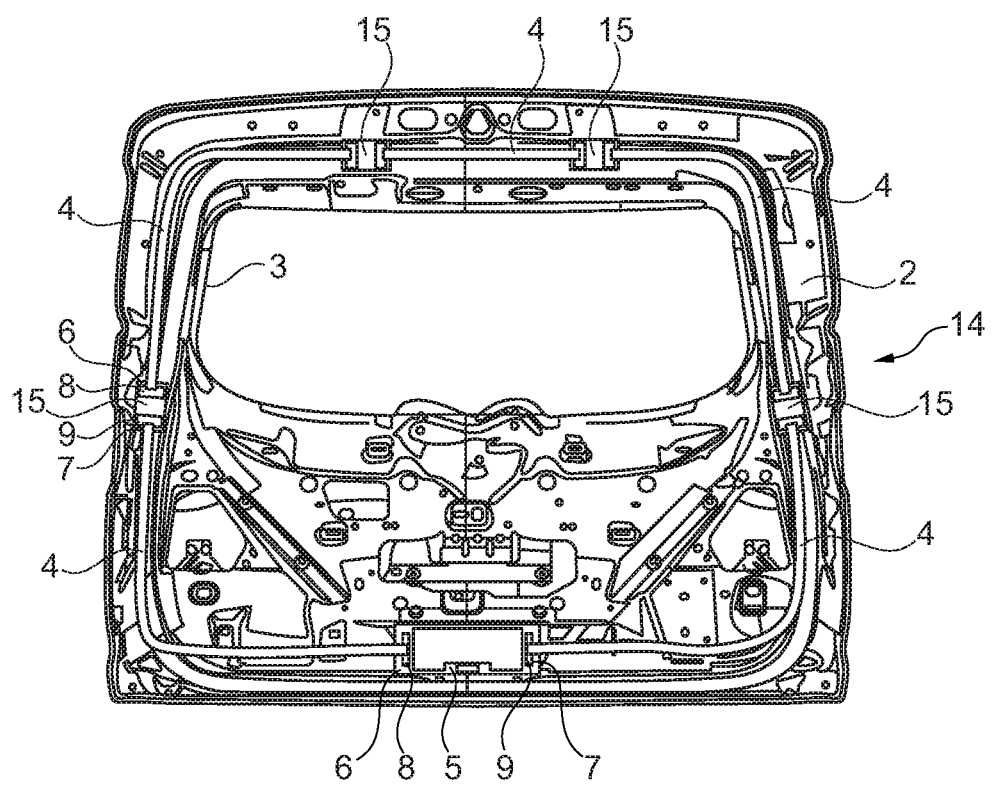
FIG. 3 is a schematic illustration of a further exemplary form of a tailgate according to the teachings of the present disclosure.

FIG. 3 shows a schematic illustration of a further exemplary form of a tailgate 14 according to the teachings of the present disclosure. The tailgate 14 differs from the exemplary form shown in FIG. 1 in that four further additional components 15 are disposed on the main body 2, and in that two additional components 5 or 15, respectively, are in each case connected to one another by way of a fiber-reinforced tape 4. Each further additional component 15 also has two laterally disposed connection portions 6 and 7, a loop of the respective fiber-reinforced tape 4 being in each case guided around said connection portions 6 and 7. To this end, two rectangular breakouts 8 and 9 through which the respective fiber-reinforced tape 4 is guided are configured on each additional component 15. The respective additional component 15 is partially or completely produced from a metal, a metal alloy, or a fiber-composite material. To avoid repetitions, reference is made in other respects to the above description of FIG. 1.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tailgate for a motor vehicle comprising:
a metallic main tailgate body;
at least one additional component with at least one connection portion, wherein the at least one additional component is at least in part embedded in the metallic main tailgate body; and
at least one fiber-reinforced tape with reinforcement fibers embedded in a matrix material, wherein a loop of the fiber-reinforced tape is guided through the at least one connection portion of the at least one additional component and the at least one fiber-reinforced tape is one of disposed on the metallic main tailgate body, disposed in the metallic main tailgate body, or disposed on the metallic main tailgate body and in the metallic main tailgate body, and the matrix material is at least in part composed of a metallic material.

2. The tailgate according to claim 1, wherein the metallic material is aluminum or magnesium.

3. The tailgate according to claim 1, wherein the fiber-reinforced tape is connected indirectly to the metallic main tailgate body by an adhesive.

4. The tailgate according to claim 1, wherein the fiber-reinforced tape is connected directly to the metallic main tailgate body in a materially integral manner.

5. The tailgate according to claim 1, wherein the matrix material is die cast to the metallic main tailgate body.

6. The tailgate according to claim 1 further comprising another additional component with at least one connection portion, wherein the another additional component is at least in part embedded in the metallic main tailgate body and a loop of the fiber-reinforced tape is guided through the at least one connection portion of the another additional component.

7. The tailgate according to claim 1, wherein the at least one additional component comprises a fastening element for a tailgate lock, wherein the fastening element comprises two laterally disposed connection portions, the fastening element is at least in part embedded in the metallic main tailgate body, and a loop of the fiber-reinforced tape is guided through the at least one connection portion.

8. The tailgate according to claim 7, wherein the fastening element is partially or completely produced from a metal or a metal alloy.

9. The tailgate according to claim 7, wherein the fastening element and the matrix material are die cast to the metallic main tailgate body.

10. The tailgate according to claim 7, wherein the matrix material is die cast to the metallic main tailgate body.

11. The tailgate according to claim 1, wherein the matrix material is completely composed of the metallic material.

12. The tailgate according to claim 11, wherein the metallic material is aluminum or magnesium.

13. The tailgate according to claim 1 further comprising a window opening, wherein the fiber-reinforced tape is disposed so as to encircle the window opening.

14. The tailgate according to claim 13, wherein the fiber-reinforced tape encircles a peripheral region of the metallic main tailgate body.

15. A tailgate for a motor vehicle comprising:
a metallic main tailgate body;
at least one additional component at least in part embedded in the metallic main tailgate body, the at least one additional component comprising at least one connection portion; and
at least one fiber-reinforced tape with reinforcement fibers embedded in a matrix material, wherein the matrix material is at least in part composed of a metallic material, a loop of the fiber-reinforced tape is guided through the at least one connection portion, and the at least one fiber-reinforced tape is one of disposed on the metallic main tailgate body, disposed in the metallic main tailgate body, or disposed on the metallic main tailgate body and in the metallic main tailgate body.

16. The tailgate according to claim 15, wherein the metallic material is aluminum or magnesium.

17. The tailgate according to claim 15, wherein the fiber-reinforced tape is connected indirectly to the metallic main tailgate body by an adhesive.

18. The tailgate according to claim 15, wherein the fiber-reinforced tape is connected directly to the metallic main tailgate body in a materially integral manner.

19. A tailgate for a motor vehicle comprising:
a metallic main tailgate body with a window opening;
a fastening element for a tailgate lock connected directly to the metallic main tailgate body in a materially integral manner, the fastening element comprising two laterally disposed connection portions; and
at least one fiber-reinforced tape with reinforcement fibers embedded in a matrix material and disposed so as to encircle the window opening, wherein the matrix material is at least in part composed of a metallic material, the at least one fiber-reinforced tape is connected directly to the metallic main tailgate body in a materially integral manner, and a loop of the fiber-reinforced tape is guided through the two laterally disposed connection portions.

20. The tailgate according to claim 19, wherein the matrix material is die cast to the metallic main tailgate body.

* * * * *